United States Patent
Tsuda et al.

(10) Patent No.: US 11,953,786 B2
(45) Date of Patent: Apr. 9, 2024

(54) DISPLAY DEVICE AND LIGHT SOURCE DEVICE

(71) Applicant: Japan Display Inc., Tokyo (JP)

(72) Inventors: Motoki Tsuda, Tokyo (JP); Naoyuki Asano, Tokyo (JP); Kazuki Ichihara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/452,626

(22) Filed: Aug. 21, 2023

(65) Prior Publication Data

US 2024/0069388 A1    Feb. 29, 2024

(30) Foreign Application Priority Data

Aug. 29, 2022   (JP) ................. 2022-135956

(51) Int. Cl.
   *G02F 1/1335*   (2006.01)
   *F21V 8/00*    (2006.01)

(52) U.S. Cl.
   CPC ....... *G02F 1/133616* (2021.01); *G02B 6/003* (2013.01)

(58) Field of Classification Search
   CPC ......... G02F 1/133603; G02F 1/133606; G02F 1/133615; G02F 1/133616; G02B 6/0036; G02B 6/0076; G03B 6/0038
   See application file for complete search history.

(56) References Cited

U.S. PATENT DOCUMENTS

| | | | | |
|---|---|---|---|---|
| 6,229,585 | B1* | 5/2001 | Yanagi | G02F 1/133615 |
| | | | | 362/616 |
| 11,796,855 | B2* | 10/2023 | Miyao | G02F 1/133605 |
| 2009/0086477 | A1* | 4/2009 | Noba | G02F 1/133603 |
| | | | | 362/231 |
| 2012/0268656 | A1* | 10/2012 | Takano | G02B 6/003 |
| | | | | 362/602 |
| 2021/0223465 | A1* | 7/2021 | Numata | G02F 1/133317 |

FOREIGN PATENT DOCUMENTS

JP   2020-060682 A   4/2020

* cited by examiner

*Primary Examiner* — Jessica M Merlin
(74) *Attorney, Agent, or Firm* — Michael Best & Friedrich LLP

(57) ABSTRACT

A lens portion of a display device includes: a first lens arranged between a light guide plate and a light-emitting element portion, and having a plurality of first prisms arranged on a first light-exiting surface; and a second lens arranged between the first lens and the light-emitting element portion, and having a plurality of second prisms arranged on a second light-exiting surface arranged at a position facing a light-entering surface. The first lens includes a plurality of diffusing prisms arranged on the light-entering surface and capable of diffusing light emitted from the second lens and introducing said light into the first lens.

4 Claims, 10 Drawing Sheets

DISPLAY DEVICE AND LIGHT SOURCE DEVICE

CROSS REFERENCE TO RELATED APPLICATIONS

The present application claims priority to Japanese Patent Application No. 2022-135956 filed on Aug. 29, 2022, the disclosure of which is incorporated herein by reference.

TECHNICAL FIELD

The present invention relates to a display device and a light source device.

BACKGROUND

Japanese Unexamined Patent Application Publication No. 2020-60682 (Patent Document 1) recites a display device in which a light guide plate is arranged between a transparent substrate and a light-emitting element.

SUMMARY

The inventors of the present application have been developing a light source device that can be used as, for example, a light source for a full-color display device. When a light-emitting diode element that emits, for example, red, green, and blue lights is used as the light-emitting element of the light source device, the red, green, and blue lights can be mixed in the lens portion to emit light that differs in color (such as white light) from the light emitted from the light-emitting element. The light in the lens portion spreads radially from a light-entering surface toward a light-exiting surface. In order to allow the mixed light to be emitted toward a front surface of the lens portion, a method of forming a plurality of prisms on an exit surface of the lens portion has been considered.

However, since prisms allow light emitted in a specific direction to be selectively refracted toward the front surface of the lens portion, in a case where a distance between the plurality of light-emitting elements is large, there may occur regions where the amount of light directed toward the front surface is insufficient. In such a case, dark regions are distributed among bright regions and can be visually recognized. In the dark regions, the amount of light directed toward the front surface of the lens portion is insufficient. To prevent this phenomenon, there is a method in which light-emitting elements are closely arranged. However, in such a case, much light not contributing as the light source light are generated. Thus, there is room for improvement in terms of efficiency of the light-emitting elements.

According to one aspect of the present invention, a display device includes: a first substrate having a first front surface and a first back surface on a side opposite to the first front surface; a liquid crystal layer arranged on the first front surface of the first substrate; a light guide plate having a first surface facing the first front surface of the first substrate, a second surface on a side opposite to the first surface, and a first side surface intersecting the first surface and the second surface; a light-emitting element portion having a plurality of light-emitting diode elements each arranged at a position facing the first side surface of the light guide plate and along a first direction; and a lens portion arranged between the light guide plate and the light-emitting element portion. The light-emitting element portion, the lens portion, and the light guide plate are arranged along a second direction intersecting the first direction. The lens portion includes: a first lens arranged between the light guide plate and the light-emitting element portion, and having a first light-entering surface, a first light-exiting surface on a side opposite to the first light-entering surface, and a plurality of first prisms arranged on the first light-exiting surface; and a second lens arranged between the first lens and the light-emitting element portion, and having a second light-exiting surface arranged at a position facing the first light-entering surface, a second light-entering surface on a side opposite to the second light-exiting surface, and a plurality of second prisms arranged on the second light-exiting surface. The first lens includes a plurality of first diffusing prisms arranged on the first light-entering surface and capable of diffusing light emitted from the second lens and introducing said light into the first lens.

According to another aspect of the present invention, a light source device includes: a light-emitting element portion having a plurality of light-emitting diode elements arranged so as to be spaced apart from one another along a first direction; and a lens portion arranged at a position facing the light-emitting element portion. The lens portion includes: a first lens having a first light-entering surface, a first light-exiting surface on a side opposite to the first light-entering surface, and a plurality of first prisms arranged on the first light-exiting surface; and a second lens arranged between the first lens and the light-emitting element portion, and having a second light-exiting surface arranged at a position facing the first light-entering surface, a second light-entering surface on a side opposite to the second light-exiting surface, and a plurality of second prisms arranged on the second light-exiting surface. The first lens includes a plurality of first diffusing prisms arranged on the first light-entering surface and capable of diffusing light emitted from the second lens and introducing said light into the first lens.

BRIEF DESCRIPTIONS OF THE DRAWINGS

DETAILED DESCRIPTION

Hereinafter, each embodiment of the present invention will be described with reference to the drawings. Note that the disclosure is only exemplary, and it is needless to say that any modification that can be easily conceived by one skilled in the art while maintaining the purpose of the invention is included in the scope of the invention. In addition, the drawings may schematically show the width, thickness, shape, and the like of each part with respect to the actual state in order to clarify the description. However, this is given only as an example and does not limit the scope of the present invention. In addition, in the present specification and each of the drawings, elements similar to those described previously with reference to the drawings are denoted by the same or related reference signs, and redundant descriptions thereof are omitted as appropriate.

The technique described hereinafter can be widely applied as a light source device for mixing the light emitted from various types of light-emitting elements. In the embodiments described below, attention is directed toward an implementation of using a light source device of a transparent display panel as an example for using a light source device.

<Transparent Display Panel>

Figure 1:
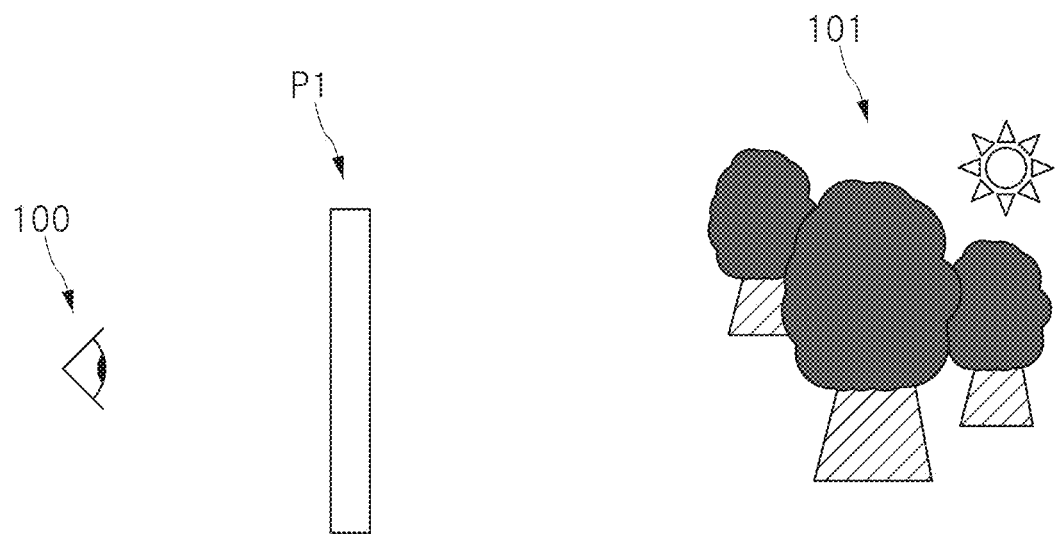
FIG. 1 is an explanatory drawing showing a positional relationship in a case where a viewer in front of one surface side of a transparent display panel device visually recognizes a background located on an opposite surface side via the transparent display panel device.
Figure 2:
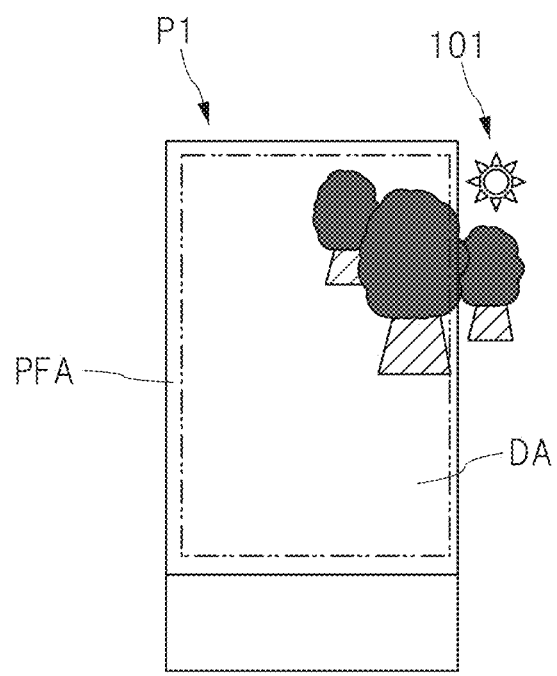
FIG. 2 is an explanatory drawing showing an example of the background visually recognized via the transparent display panel device.

First, features of the so-called transparent display panel will be described. FIG. 1 is an explanatory drawing showing a positional relationship in a case where a viewer in front of one surface side of a transparent display panel visually recognizes a background located on an opposite surface side via the transparent display panel device. FIG. 2 is an explanatory drawing showing an example of the background visually recognized via the transparent display panel.

As shown in FIG. 1, in a case where an observer 100 in front of one side of a display panel P1 views the other side of the panel, a background 101 is visually recognized through the display panel P1. As shown in FIG. 2, in a case where a display region DA and a peripheral region PFA outside of the display region DA both allow transmission of light, the observer 100 can visually recognize the entire background 101 without discomfort. On the other hand, in a case where the peripheral region PFA has light-blocking properties that blocks transmission of light, a portion of the background 101 visually recognized via the display panel P1 is blocked by the peripheral region PFA, causing possible discomfort to the observer 100 (see FIG. 1). Thus, in the case of the display panel P1 which is the transparent display panel, it is preferable that the display region DA and the peripheral region PFA each have visible light transmissivity. In addition, it is particularly preferable that the display region DA and the peripheral region PFA have approximately the same level of visible light transmissivity from the viewpoint of visually recognizing the background 101 without discomfort.

Figure 3:
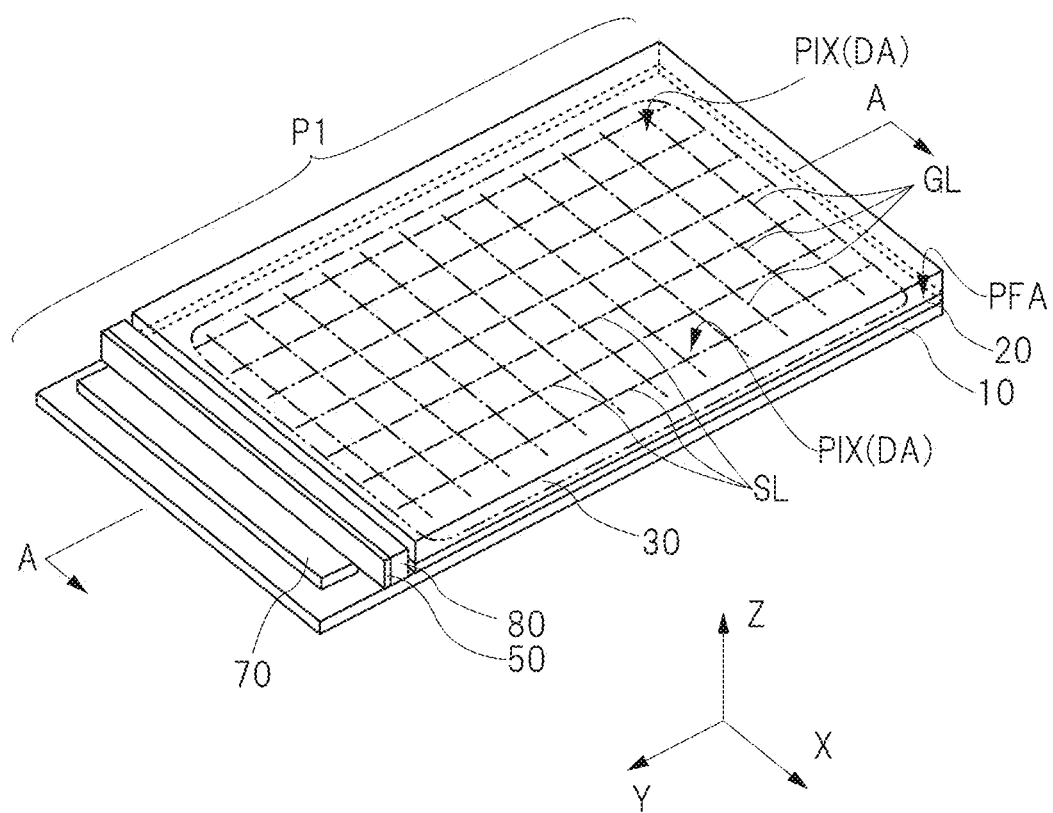
FIG. 3 is a perspective view showing an example of a transparent display panel shown in FIG. 1.
Figure 5:
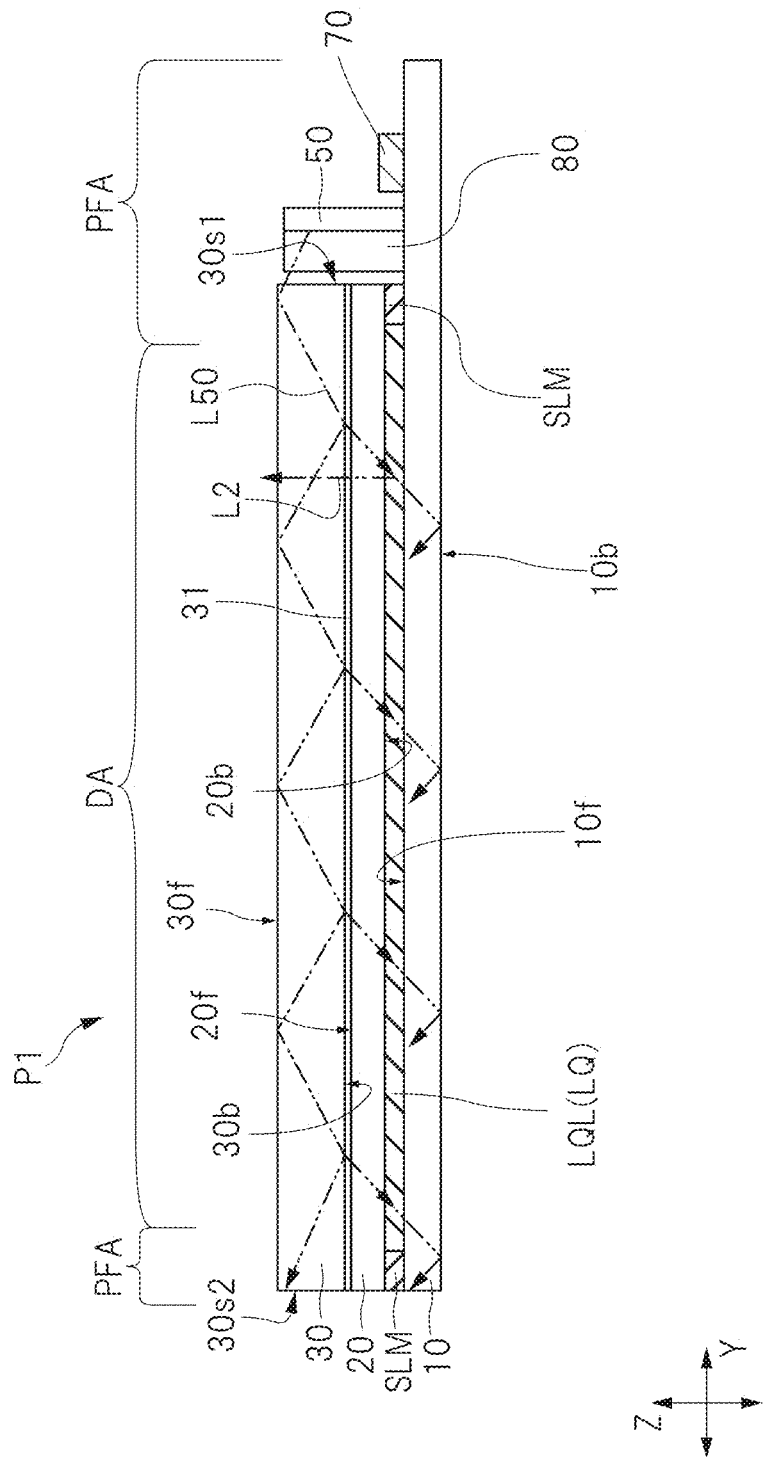
FIG. 5 is a cross-sectional view taken along the line A-A shown in FIG. 3.
Figure 6:
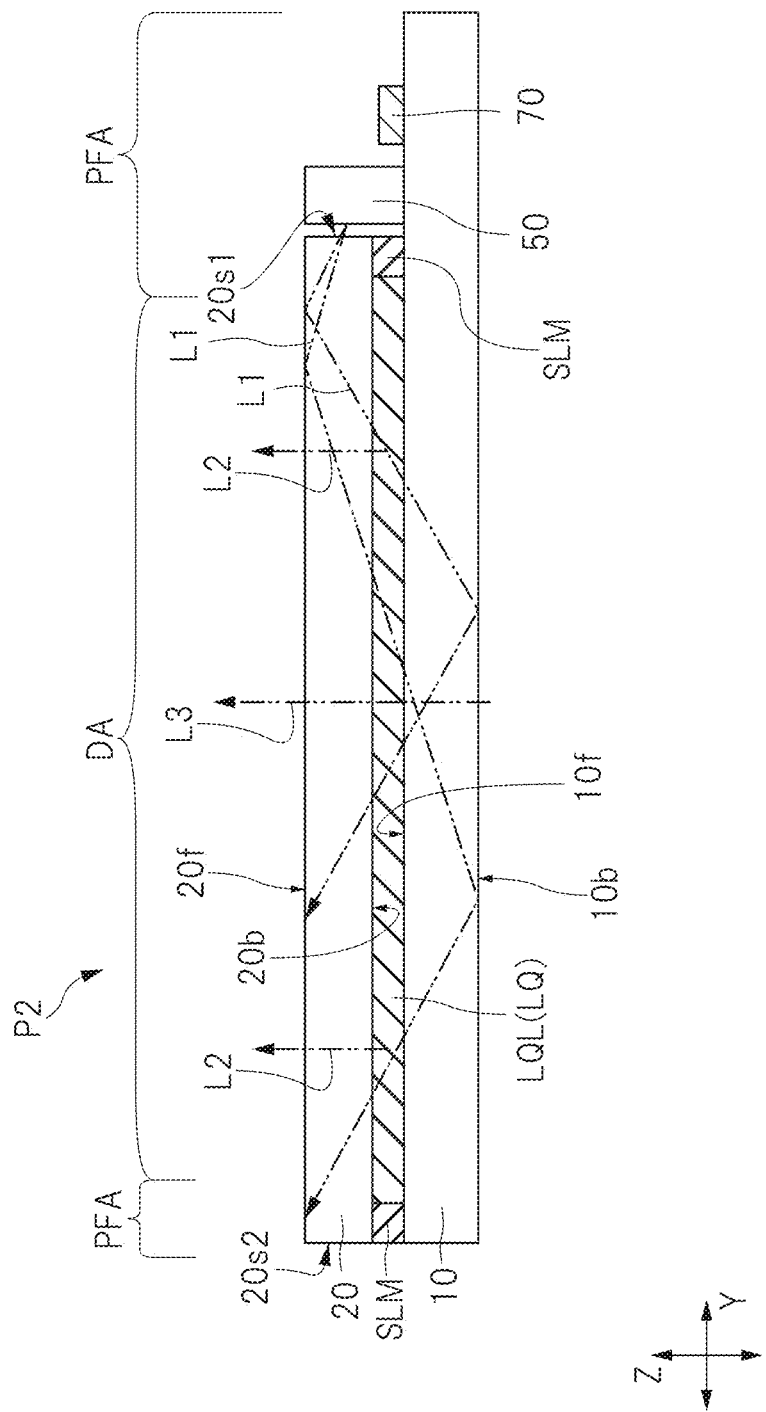
FIG. 6 is an explanatory drawing schematically showing a path of light emitted from a light-emitting element portion of a transparent display device according to a studied example.

FIG. 3 is a perspective view showing an example of the transparent display panel shown in FIG. 1. In FIG. 3, a boundary between the display region DA and the peripheral region PFA is indicated by a double-dashed line. In addition, in FIG. 3, among the circuits of the display panel P1, parts of signal wirings configured to transmit signals to drive the liquid crystal (in detail, gate lines GL and source lines SL) are schematically indicated by dash-and-dot lines. In the following drawings including FIG. 3, a direction along a thickness direction of the display panel P1 is defined as the Z direction, a direction extending from one side of the display panel P1 in an XY plane orthogonal to the Z direction is defined as the X direction, and a direction intersecting the X direction is defined as the Y direction. FIG. 5 is a cross-sectional view taken along the line A-A shown in FIG. 3. FIG. 6 is an explanatory drawing schematically showing a path of light emitted from a light-emitting element portion of a transparent display device according to a studied example.

As shown in FIG. 3, the display panel P1 of the present embodiment has a substrate (array substrate) 10, another substrate (counter substrate) 20, a light guide plate (also referred to as first light guide plate or first cover glass) 30, a light-emitting element portion 50, a drive circuit 70, and a lens portion 80.

When used as a display device, the display panel P1 shown in FIG. 3 may include, for example, a control circuit, a flexible substrate connected to the display panel P1, a housing or the like in addition to the above-described parts. In FIG. 3, parts other than the display panel P1 are omitted.

The display panel P1 has the display region DA in which an image is formed in response to an input signal supplied from the outside, and the peripheral region (frame region) PFA around the display region DA. The display region DA of the display panel P1 shown in FIG. 3 has a rectangular shape. However, the display region may have a shape other than a rectangular shape, such as a polygonal shape or a circular shape. The display region DA is an effective region in which the display panel P1 displays an image in plan view of a display surface. Each of the substrate 10, the substrate 20, and the light guide plate 30 is located at a position overlapping the display region DA in plan view. In the example shown in FIG. 1, each of the light-emitting element portion 50, the drive circuit 70, and the lens portion 80 is mounted on the substrate 10. However, as a modification example, a light source substrate (not shown) that differs from the substrate 10 may be provided as a member separate from the display panel P1, and the light-emitting element portion 50 and the lens portion 80 may be mounted on the light source substrate (not shown). Even in such a modification example, the light-emitting element portion 50 and the lens portion 80 allow light to enter the display panel P1 from a side of the display panel P1 as described below.

Figure 4:
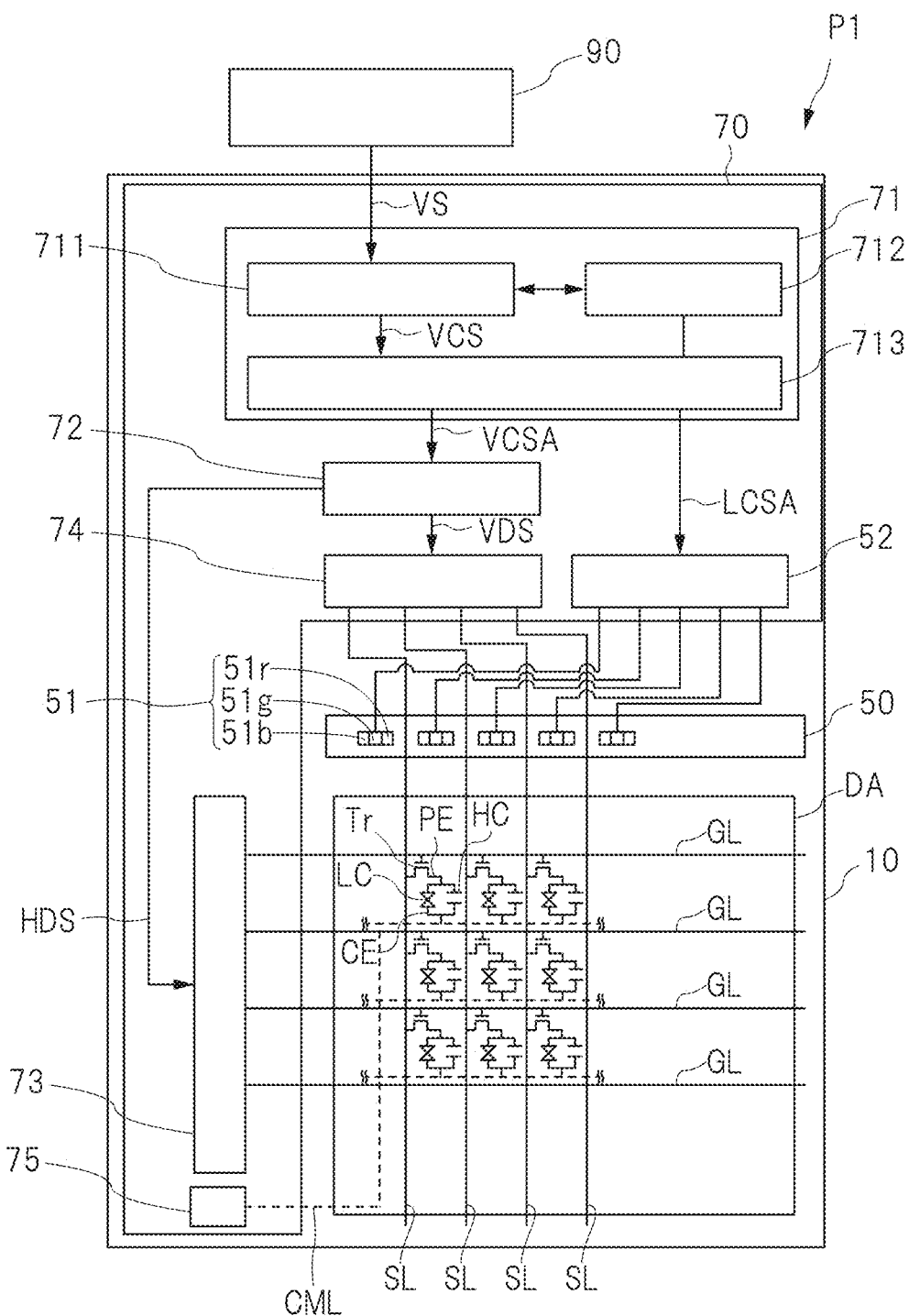
FIG. 4 is a circuit block diagram showing an example of circuits of the display panel shown in FIG. 3.

First, a configuration example of circuits of the display panel P1 shown in FIG. 3 will be described. FIG. 4 is a circuit block diagram showing an example of circuits of the display panel shown in FIG. 3. A wiring path connected to a common electrode CE shown in FIG. 4 is formed on, for example, the substrate 20 shown in FIG. 5 described below. In FIG. 4, wirings formed on the substrate 20 are indicated by dotted lines. In the example shown in FIG. 4, the drive circuit 70 includes a light source control unit 52. As a modification example, the light-emitting element portion 50 and the light source control unit 52 may be provided separately from the drive circuit 70. As described above, the light source substrate (not shown) that differs from the substrate 10 may be provided as a member separate from the display panel P1, and the light-emitting element portion 50 may be mounted on the light source substrate (not shown). In such a case, the light source control unit 52 is formed on, for example, the light source substrate (not shown). Alternatively, the light source control unit 52 is formed in an electronic component mounted on the light source substrate (not shown).

In the example shown in FIG. 4, the drive circuit 70 comprises a signal processing circuit 71, a pixel control circuit 72, a gate drive circuit 73, a source drive circuit 74, and a common potential drive circuit 75. In addition, the light-emitting element portion 50 comprises, for example, a light-emitting diode element 51r, a light-emitting diode element 51g, and a light-emitting diode element 51b. A combination of the light-emitting diode element 51r, the light-emitting diode element 51g, and the light-emitting diode element 51b will be described in detail below. As shown in FIG. 3, the substrate 10 has a larger area than the substrate 20, and thus, the drive circuit 70 is provided on the substrate 10.

The signal processing circuit 71 comprises an input signal analyzing unit (input signal analyzing circuit) 711, a storage unit (storage circuit) 712, and a signal adjusting unit 713. The display panel P1 has a control unit 90 comprising a control circuit configured to control image display, and the input signal analyzing unit 711 of the signal processing circuit 71 receives an input signal VS from the control unit 90 via a wiring path such as a flexible wiring board (not shown). The input signal analyzing unit 711 performs analysis processing based on the input signal VS received from the outside, and generates an input signal VCS. The input signal VCS is, for example, a signal to determine what gradation value is given to each pixel PIX (see FIG. 3) of the display panel P1 (see FIG. 3) based on the input signal VS.

The signal adjusting unit 713 generates an input signal VCSA from the input signal VCS received from the input signal analyzing unit 711. The signal adjusting unit 713 sends the input signal VCSA to the pixel control circuit 72, and sends a light source control signal LCSA to the light source control unit 52. The light source control signal LCSA is, for example, a signal including information on the amount of light of the light-emitting element portion 50 that is set in accordance with the gradation value input to the pixel PIX.

The pixel control circuit 72 generates a horizontal drive signal HDS and a vertical drive signal VDS based on the input signal VCSA. For example, in the present embodiment, driving is performed by a field sequential method, and thus, the horizontal drive signal HDS and the vertical drive signal VDS are generated for each color that the light-emitting element portion 50 can emit. The gate drive circuit 73 sequentially selects the gate lines GL of the display panel P1 (see FIG. 3) within one vertical scanning period based on the horizontal drive signal HDS. The gate lines GL can be selected in any order. As shown in FIG. 3, the plurality of gate lines (signal wirings) GL extend in the X direction and are arranged along the Y direction.

The source drive circuit 74 supplies a gradation signal in accordance with an output gradation value of each pixel PIX (see FIG. 3) of each source line SL of the display panel P1 (see FIG. 3) within one horizontal scanning period based on the vertical drive signal VDS. As shown in FIG. 3, the plurality of source lines (signal wirings) SL extend in the Y direction and are arranged along the X direction. One pixel PIX is formed at each intersection of the gate lines GL and the source lines SL. A switching element Tr (see FIG. 4) is formed at each intersecting portion of the gate lines GL and the source lines SL. The plurality of gate lines GL and the plurality of source lines SL shown in FIGS. 3 and 4 correspond to a plurality of signal wirings configured to transmit drive signals for driving a liquid crystal LQ shown in FIG. 5 (and FIG. 6) described below.

For example, a thin film transistor is used as the switching element Tr shown in FIG. 4. The type of thin film transistor is not particularly limited, and examples include the following. When classified according to a position of the gate, bottom gate transistors or top gate transistors can be given as examples. In addition, when classified according to the number of gates, single-gate thin film transistors and double-gate thin film transistors can be given as examples. One of a source electrode and a drain electrode of the switching element Tr is connected to the source line SL, and a gate electrode is connected to the gate line GL. The other of the source electrode and the drain electrode is connected to one end of a capacitor of a polymer-dispersed liquid crystal LC (liquid crystal LQ shown in FIGS. 5 and 6). The capacitor of the polymer-dispersed liquid crystal LC has one end connected to the switching element Tr via a pixel electrode PE and the other end connected to a common potential wiring CML via the common electrode CE. In addition, a holding capacitor HC is generated between the pixel electrode PE and a holding capacitor electrode electrically connected to the common potential wiring CML. Note that the common potential wiring CML is supplied by the common potential drive circuit 75.

Next, an optical path of light emitted from the light-emitting element portion 50 in the display panel P1 shown in FIG. 3 will be described. For the sake of simplicity, a display panel P2 having a simplified structure as shown in FIG. 6 will be used for the description. Note that the display panel P2 shown in FIG. 6 is similar to the display panel P1 shown in FIG. 5 except that it does not have the light guide plate 30. In the case of the display panel P2, the substrate 20 is used as the light guide plate. Therefore, the following description regarding the display panel P2 can also be applied to the display panel P1 shown in FIG. 5.

As shown in FIG. 6, the display panel P2 has the substrate and the substrate 20 bonded to each other so as to face each other with a liquid crystal layer LQL interposed therebetween. The substrate 10 and the substrate 20 are arranged in the Z direction which is the thickness direction of the display panel P2. In other words, the substrate 10 and the substrate 20 face each other in the thickness direction (Z direction) of the display panel P2. The substrate 10 has a front surface (main surface, surface) 10f facing the liquid crystal layer LQL (and the substrate 20). In addition, the substrate 20 has a back surface (main surface, surface) 20b facing the front surface 10f (and the liquid crystal layer LQL) of the substrate 10. The substrate 10 is an array substrate in which a plurality of transistors (transistor elements) serving as switching elements (active elements) Tr (see FIG. 4) are arranged in an array. In addition, the substrate 20 is a substrate provided on a display surface side. The substrate 20 can be rephrased as a counter substrate in the sense that it is a substrate arranged so as to face the array substrate.

The liquid crystal layer LQL containing the liquid crystal LQ is located between the front surface 10f of the substrate 10 and the back surface 20b of the substrate 20. The liquid crystal layer LQL is an optical modulation element. The display panel P2 has a function for controlling a state of an electric field formed around the liquid crystal layer LQL via the above-described switching elements to modulate transmission of light. The display region DA in the substrate 10 and the substrate 20 overlaps the liquid crystal layer LQL as shown in FIG. 6.

In addition, the substrate 10 and the substrate 20 are bonded to each other via a sealing portion (sealing material)

SLM. As shown in FIGS. 3 and 6, the sealing portion SLM (see FIG. 6) is arranged in the peripheral region PFA so as to surround the display region DA. As shown in FIG. 6, the liquid crystal layer LQL is located inside the sealing portion SLM. The sealing portion SLM serves as a seal that seals the liquid crystal between the substrate 10 and the substrate 20. In addition, the sealing portion SLM serves as an adhesive material that bonds the substrate 10 and the substrate 20.

The light-emitting element portion 50 is arranged at a position facing a side surface 20s1 of the substrate 20. As schematically indicated by double-dot-and-dash lines in FIG. 6, light source light L1 emitted from the light-emitting element portion 50 propagates in a direction away from the side surface 20s1 while being reflected at a back surface 10b of the substrate and a front surface 20f of the substrate 20. In a propagation path of the light source light L1, the back surface 10b of the substrate 10 and the front surface 20f of the substrate 20 are interfaces between a medium with a large refractive index and a medium with a small refractive index. Thus, in a case where incident angles at which the light source light L1 enters the front surface 20f and the back surface 10b are larger than a critical angle, the light source light L1 is totally reflected at the front surface 20f and the back surface 10b.

The liquid crystal LQ is the polymer-dispersed liquid crystal LC (see FIG. 4), and contains a liquid crystalline polymer and liquid crystal molecules. The liquid crystalline polymer is formed in stripes, and the liquid crystal molecules are dispersed in gaps of the liquid crystalline polymer. Each of the liquid crystalline polymer and the liquid crystal molecules has an optical anisotropy or a refractive index anisotropy. A responsiveness of the liquid crystalline polymer to an electric field is lower than a responsiveness of the liquid crystal molecules to an electric field. An orientation direction of the liquid crystalline polymer hardly changes with or without an electric field. On the other hand, an orientation direction of each of the liquid crystal molecules changes in accordance with an electric field in a state where a voltage greater than or equal to a threshold value has been applied to the liquid crystal LQ. In a state where no voltage is applied to the liquid crystal LQ, an optical axis of each of the liquid crystalline polymer and the liquid crystal molecules are parallel to one another, and the light source light L1 that has entered the liquid crystal layer LQL is transmitted through the liquid crystal layer LQL with almost no scattering (transparent state). In a state where a voltage has been applied to the liquid crystal LQ, the optical axis of each of the liquid crystalline polymer and the liquid crystal molecules intersect one another, and the light source light L1 that has entered the liquid crystal LQ is scattered in the liquid crystal layer LQL (scattering state). The display panel P2 controls an orientation of the liquid crystal LQ in the propagation path of the light source light L1 to control the transparent state and the scattering state. In the scattering state, the light source light L1 is emitted by the liquid crystal LQ from the front surface 20f side to the outside of the display panel P2 as emitted light L2. In addition, background light L3 that has entered from the back surface 10b side is transmitted through the substrate 10, the liquid crystal layer LQL, and the substrate 20, and is emitted from the front surface 20f to the outside. The emitted light L2 and the background light L3 are visually recognize by the observer in front of the front surface 20f side. The observer can recognize the emitted light L2 and the background light L3 in combination. A display panel that allows the observer to recognize a display image and a background overlapping each other in such a manner is referred to as a transparent display panel.

The display panel P1 shown in FIG. 5 differs from the display panel P2 shown in FIG. 6 in that the light guide plate is arranged on the substrate 20, the lens portion 80 is arranged between the light guide plate 30 and the light-emitting element portion 50, and light source light L50 emitted from the light-emitting element portion 50 enters the liquid crystal layer LQL via the lens portion 80 and the light guide plate 30. The display panel (display device) P1 includes: the substrate 10 having the front surface 10f, and the back surface 10b on a side opposite to the front surface 10f; the substrate 20 having the back surface 20b facing the front surface 10f, and the front surface 20f on a side opposite to the back surface 20b; and the liquid crystal layer LQL arranged between the front surface 10f of the substrate 10 and the back surface 20b of the substrate 20. This is similar to the display panel P2 shown in FIG. 6. In addition to the above, the display panel P1 includes: the light guide plate 30 bonded to and fixed on the front surface 20f of the substrate 20 via an adhesive layer 31; the light-emitting element portion 50 arranged on the front surface 10f of the substrate 10 at a position facing a side surface 30s1 of the light guide plate 30, and having a plurality of light-emitting diode elements 51 (see FIG. 4); and the lens portion 80 arranged between the light guide plate 30 and the light-emitting element portion 50.

The light guide plate 30 has a back surface 30b facing the front surface 20f of the substrate 20, and a front surface 30f on a side opposite to the back surface 30b. In addition, the light guide plate 30 has the side surface 30s1 facing the light-emitting element portion 50 with the lens portion 80 interposed therebetween, and a side surface 30s2 located on a side opposite to the side surface 30s1. The light guide plate 30 is bonded to and fixed on the substrate 20 via the adhesive layer 31. In at least the display region DA, a gap between the light guide plate and the substrate 20 is filled with the adhesive layer 31. In the example shown in FIG. 5, the adhesive layer 31 is bonded to the entire back surface 30b of the light guide plate 30. The light source light L50 emitted from the light-emitting element portion 50 is diffused at the lens portion 80, enters the light guide plate 30 from the side surface 30s1, and travels toward the side surface 30s2 while being reflected.

The adhesive layer 31 is made of a transparent resin material that allows transmission of visible light. Examples of the adhesive layer 31 with visible light transmissivity include a transparent adhesive sheet referred to as an optical clear adhesive (OCA) formed as a sheet, and optical clear resin (OCR) obtained by curing a liquid transparent adhesive. Although there are various modification examples in refractive indices of the substrate 10, the substrate 20, and the light guide plate 30, these refractive indices are, for example, about 1.5. The refractive index of the adhesive layer 31 is close to the refractive index of the light guide plate 30, and is, for example, about 1.37 to 1.5.

In such as case, a portion of the light source light L50 is not reflected at an interface with the adhesive layer 31, and enters the substrate 20. The light that has entered the substrate travels toward the liquid crystal layer LQL in the same manner as the light source light L1 shown in FIG. 6, and enters the liquid crystal layer LQL. The light that has scattered at the liquid crystal layer LQL is emitted from the front surface 20f to the outside of the display panel P1 as the emitted light L2. On the other hand, the light that has not scattered at the liquid crystal layer LQL is reflected at the back surface 10b of the substrate 10 and the front surface 20f of the substrate 20 (or the front surface 30f of the light guide plate 30), and propagates in a direction away from the light-emitting element portion 50.

<Structures of Light-Emitting Element Portion and Lens>

Figure 7:
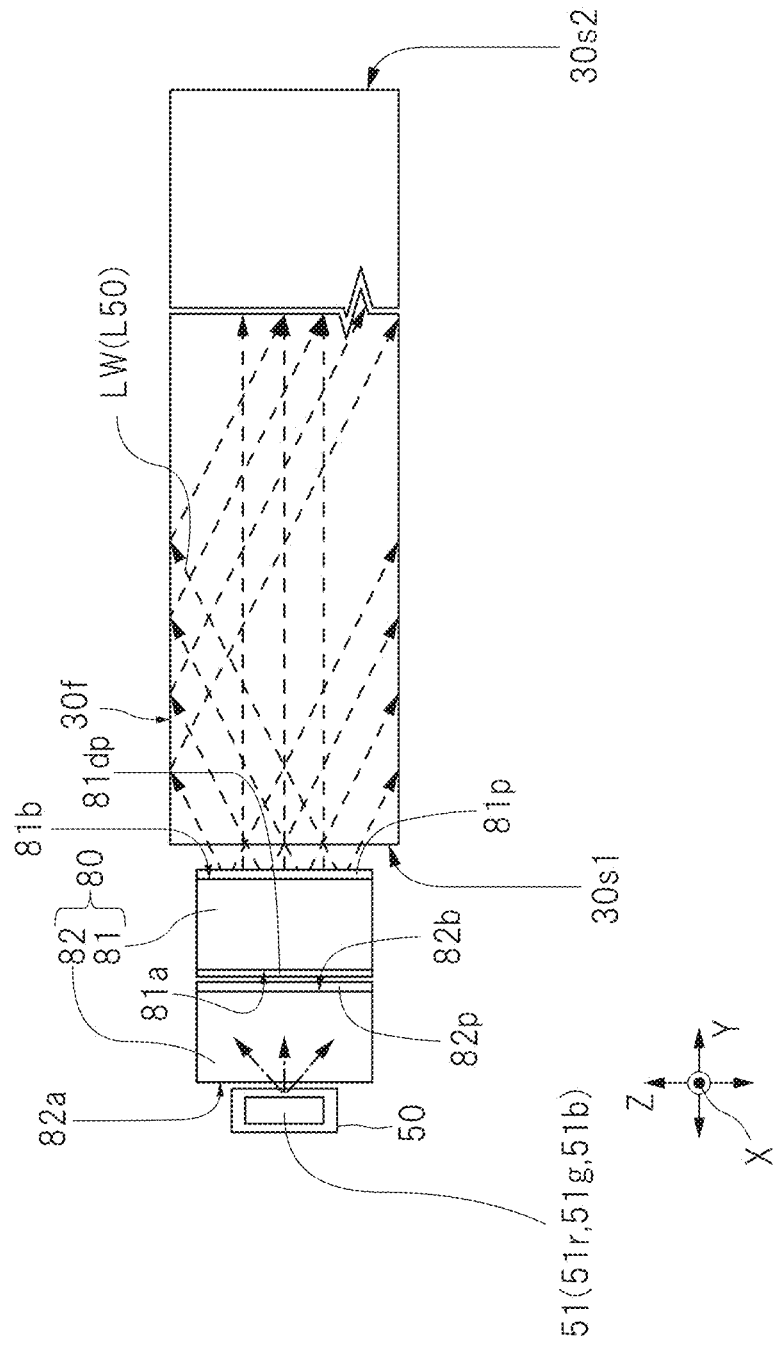
FIG. 7 is a cross-sectional view showing structural examples of a light-emitting element portion, a lens portion, and a light guide plate shown in FIG. 3.
Figure 8:
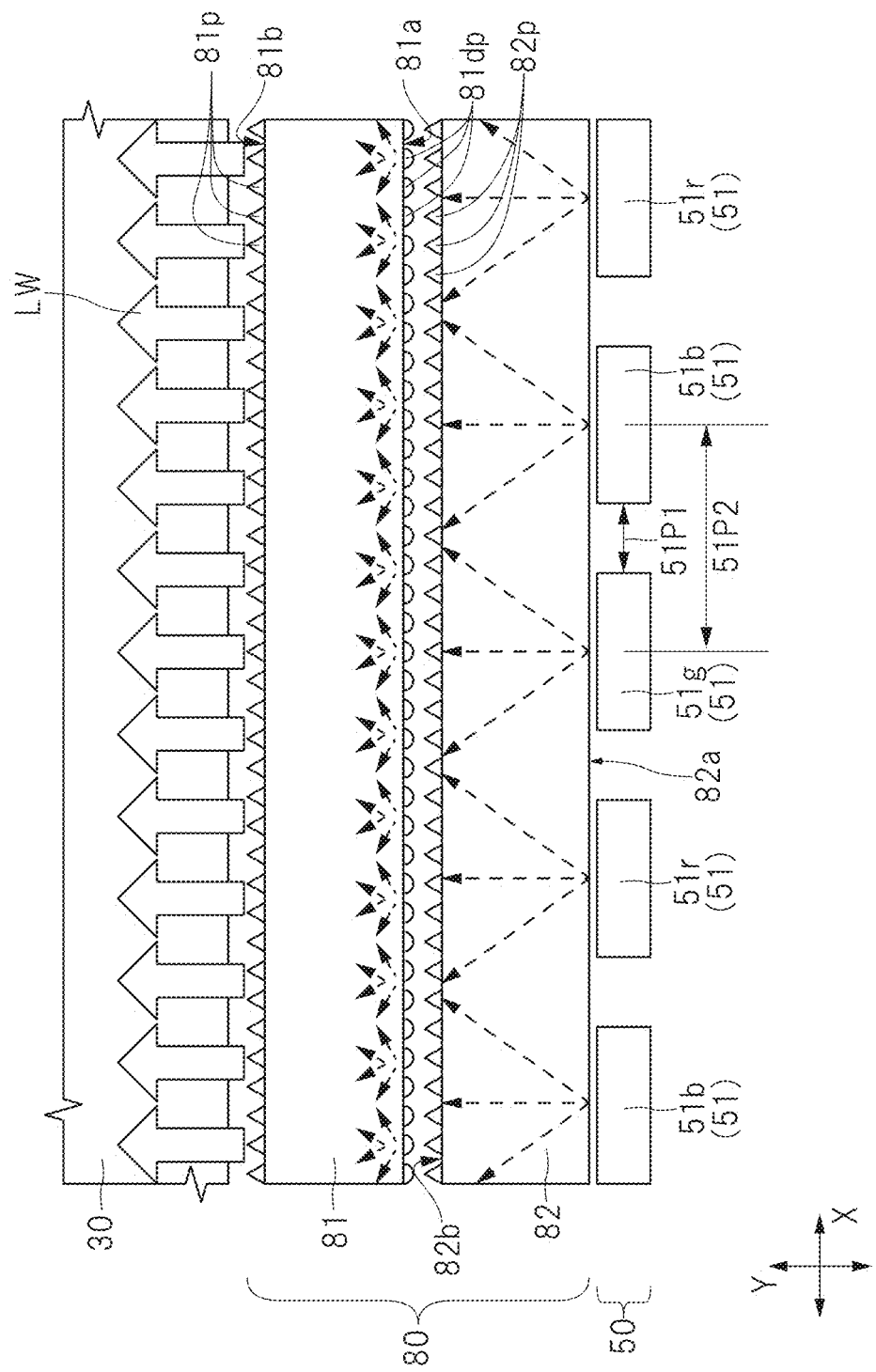
FIG. 8 is an enlarged plan view of the light-emitting element portion, the lens portion, and the light guide plate shown in FIG. 3 when viewed from above.
Figure 9:
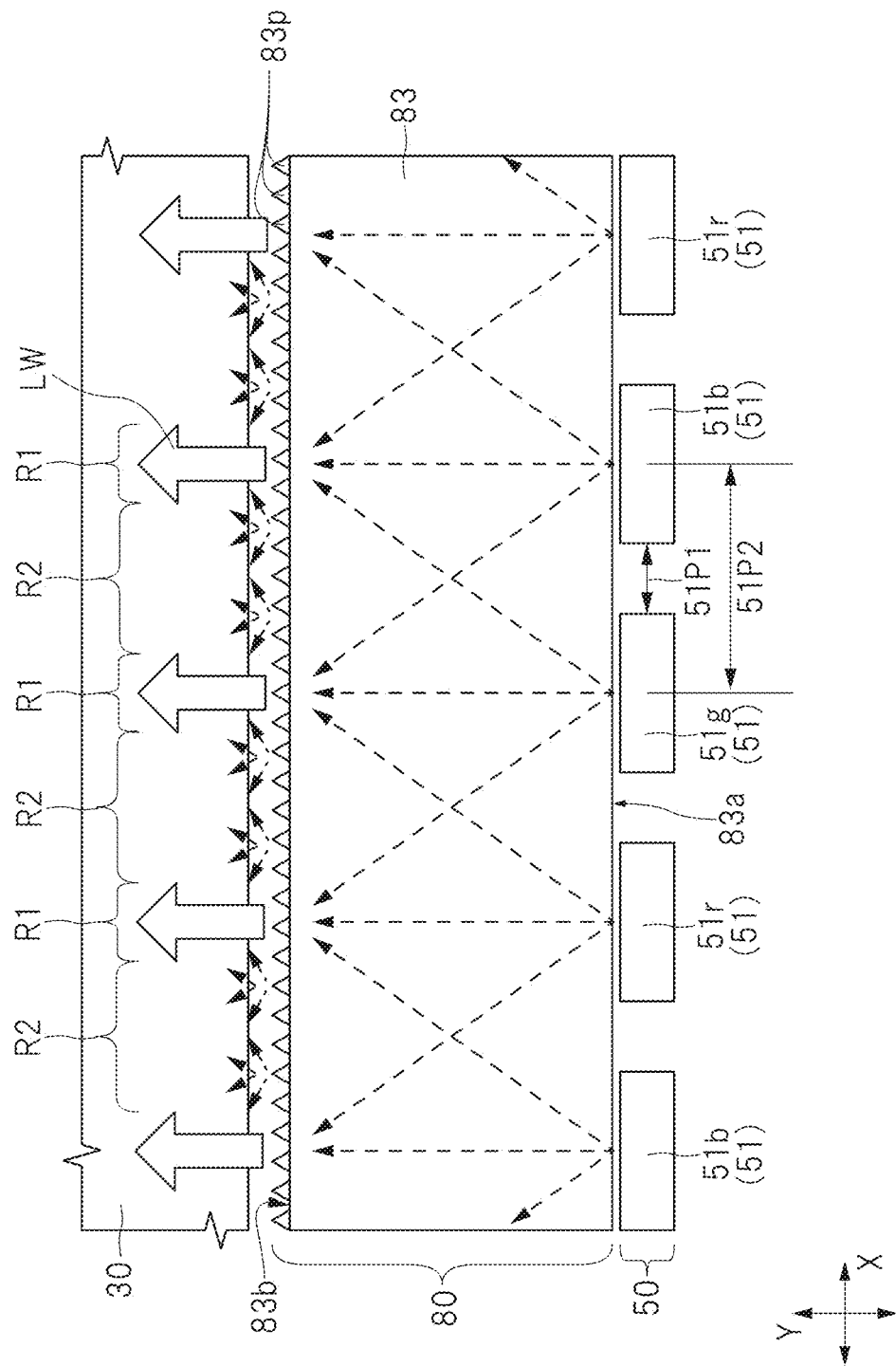
FIG. 9 is an enlarged plan view showing a studied example with respect to FIG. 8.

Next, structures of the light-emitting element portion and the lens will be described. FIG. 7 is a cross-sectional view showing structural examples of the light-emitting element portion, the lens portion, and the light guide plate shown in FIG. 3. The cross section shown in FIG. 7 is the cross section taken along the line A-A of FIG. 3, that is, the same cross section as FIG. 5. FIG. 8 is an enlarged plan view of the light-emitting element portion, the lens portion, and the light guide plate shown in FIG. 3 when viewed from above. FIG. 9 is an enlarged plan view showing a studied example with respect to FIG. 8. In the following, an example in which the light guide plate 30 is arranged on the front surface side of the substrate 20 separately from the substrate 20 as in the display panel P1 shown in FIG. will be described. However, the technique described below can be applied to a case where the light guide plate 30 is not provided and the substrate 20 is regarded as the light guide plate as in the display panel P2 shown in FIG. 6. In this case, the lens portion 80 shown in FIG. 5 is arranged between the substrate 20 and the light-emitting element portion 50 shown in FIG. 6. In addition, in this case, the "light guide plate 30" described below can be replaced with the "substrate 20".

As shown in FIG. 7, the light-emitting element portion 50, the lens portion 80, and the light guide plate 30 are arranged along the Y direction intersecting the X direction. The lens portion 80 includes: a lens 81 arranged between the light guide plate 30 and the light-emitting element portion 50, and having prisms 81p arranged on a light-exiting surface 81b; and a lens 82 arranged between the lens 81 and the light-emitting element portion 50, and having prisms 82p arranged on a light-exiting surface 82b. In addition, the lens 81 includes diffusing prisms 81dp arranged on a light-entering surface 81a and capable of diffusing light emitted from the lens 82 and introducing said light into the lens 81.

The lens is an optical member of a light guiding member that allows transmission of visible light and has a function of diverging or converging light using the difference in refractive indices. The lens portion 80 is a type of light guide plate. However, in the present embodiment, the light guide plate 30 arranged in the display region DA (see FIG. 3) will be described as a distinctive member from the lens portion 80. In addition, a prism is an optical element that disperses, refracts, or reflects light. In the case of the present embodiment, the prisms 81p arranged on the light-exiting surface 81b of the lens 81 each have a function of changing the direction of the light propagated in the lens 81 and oriented in some directions to a direction normal to the light-exiting surface 81b (Y direction in the example shown in FIGS. 7 and 8). In addition, the prisms 82p arranged on the light-exiting surface 82b of the lens 82 each have a function of changing the direction of the light propagated in the lens 82 and oriented in some directions to a direction normal to the light-exiting surface 82b (Y direction in the example shown in FIGS. 7 and 8). In addition, the diffusing prisms 81dp arranged on the light-entering surface 81a of the lens 81 each have a function of diffusing the light emitted from the light-exiting surface 82b of the lens 82 and introducing said light into the lens 81.

In the case of the full-color display device as shown in, for example, FIG. 7, the light-emitting diode element 51r is used as a red light source element, the light-emitting diode element 51g is used as a green light source element, and the light-emitting diode element 51b is used as a blue light source element. In the case of the display device as shown in FIG. 7, light emitted from the light sources of different colors are mixed to reproduce light such as white light, and light of the reproduced color is irradiated toward the light guide plate 30. However, the light emitted from each of the light source elements spreads radially from an exit surface of the light source element. Thus, in order to introduce the mixed-color light into the light guide plate 30, the prisms 81p may be provided on the light-exiting surface of the lens portion 80 (in the case of the example shown in FIG. 7, the light-exiting surface 81b of the lens 81).

Hereinafter, an example in which prisms 83p are formed on a light-exiting surface 83b of a lens 83 will be described using the studied example shown in FIG. 9. In FIG. 9, the lens 83 is arranged between the light guide plate 30 and the light-emitting element portion 50. The lens 83 includes a light-entering surface 83a, a light-exiting surface 83b on a side opposite to the light-entering surface 83a, and the plurality of prisms 83p arranged on the light-exiting surface 83b. The prisms 83p each have a function similar to those of the prisms 81p shown in FIG. 8. That is, the prisms 83p each have a function of changing the direction of the light propagated in the lens 83 and oriented in some directions to a direction normal to the light-exiting surface 83b (Y direction in the example shown in FIG. 9).

The light emitted from the plurality of light-emitting diode elements 51 enters from the light-entering surface 83a of the lens 83 and travels in the lens 83. In the lens 83, the light radially travels from the light-entering surface 83a toward the light-exiting surface 83b, and thus, a thickness of the lens 83 (distance from the light-entering surface 83a to the light-exiting surface 83b in the Y direction) requires a certain thickness in order to mix light of various colors. If the red light, green light, and blue light are mixed in the vicinity of the prisms 83p, a direction of the mixed light is changed to the Y direction by optical functions of the prisms 83p, and white light LW enters the light guide plate 30.

However, according to studies by the present inventor and as shown in FIG. 9, it was found that, when one lens 83 is simply arranged between the light guide plate 30 and the light-emitting element portion 50, luminance of the white light LW becomes uneven in the light guide plate 30 depending on an arrangement interval of the plurality of light-emitting diode elements 51. In detail, as shown in FIG. 9, luminance of the white light LW is high in a region R1 overlapping a center (light-emitting point) of each of the light-emitting diode elements 51 in the Y direction, and luminance is low in a region R2 away from the region R1 overlapping the center (light-emitting point) of each of the light-emitting diode elements 51 in the Y direction. Thus, in plan view, stripes are formed between bright and dark regions.

In a case where the light source device for the display device is used in a state shown in FIG. 9, the observer would visually recognize the uneven luminance of the white light LW. This does not mean that light does not enter the light guide plate 30 at all between adjacent regions R1. As schematically shown in FIG. 9, light in a direction inclined with respect to the Y direction is diffused and enters the light guide plate 30. However, this light has a luminance lower than the white light LW in the region R1, whereby the observer would visually recognize it as a dark region.

On the other hand, it is possible to suppress formation of the stripes between the bright and dark regions by adjusting the thickness of the lens 83, angles of the prisms 83p, or an arrangement pitch of the light-emitting diode elements 51.

However, this requires an optimal adjustment for each product specification, leading to a more complicated process. In addition, it is possible to arrange a number of light-emitting diode elements 51 in a high-density arrangement as another means to improve uneven luminance. However, in such a case, the increase in the number of light-emitting diode elements 51 is likely to cause an increase in cost and power consumption, and it would be necessary to take measures to dissipate heat in order to suppress an increase in temperature of the display device.

Based on the results of the above-described studies, the present inventor found a configuration of the light source device of the present embodiment shown in FIG. 8. As shown in FIG. 8, the light-emitting element portion 50, the lens portion 80, and the light guide plate 30 are arranged along the Y direction intersecting the X direction. The lens portion 80 includes the lens 81 arranged between the light guide plate 30 and the light-emitting element portion 50, and having the light-entering surface 81a, the light-exiting surface 81b on a side opposite to the light-entering surface 81a, and the plurality of prisms 81p arranged on the light-exiting surface 81b. In addition, the lens portion 80 includes the lens 82 arranged between the lens 81 and the light-emitting element portion 50, and having a light-entering surface 82a arranged at a position facing the light-exiting surface 81b, the light-exiting surface 82b arranged on a side opposite to the light-entering surface 82a, and the plurality of prisms 82p arranged on the light-exiting surface 82b. In addition, the lens 81 includes the plurality of diffusing prisms 81dp arranged on the light-entering surface 81a and capable of diffusing light emitted from the lens 82 and introducing said light into the lens 81.

In a case where the light-emitting element portion 50 and the lens portion 80 shown in FIG. 8 are combined and considered as the light source device, the structure of the light source device can be expressed as follows. The lens portion 80 includes the lens 81 arranged between the light guide plate 30 and the light-emitting element portion 50, and having the light-entering surface 81a, the light-exiting surface 81b on a side opposite to the light-entering surface 81a, and the plurality of prisms 81p arranged on the light-exiting surface 81b. In addition, the lens portion 80 includes the lens 82 arranged between the lens 81 and the light-emitting element portion 50, and having the light-exiting surface 82b arranged at a position facing the light-entering surface 81a, the light-entering surface 82a on a side opposite to the light-exiting surface 82b, and the plurality of prisms 82p arranged on the light-exiting surface 82b. In addition, the lens 81 includes the plurality of diffusing prisms 81dp arranged on the light-entering surface 81a and capable of diffusing light emitted from the lens 82 and introducing said light into the lens 81.

In the case of the present embodiment, the path of light up to the light-exiting surface 82b of the lens 82 is similar to the path of light described with reference to FIG. 9. The lens 82 has a thickness in the Y direction (distance from the light-entering surface 82a to the light-exiting surface 82b) that is relatively shorter than that of the lens 83 and thus is thinner than the lens 83, and the three colors of light may not be sufficiently mixed at a stage where it reaches the light-exiting surface 82b. However, in the case of the present embodiment, the lens 82 is provided as a pre-processing mechanism to sufficiently mix the three colors of light in the lens 81. Thus, there is no particular problem even if the light is not sufficiently mixed at the light-exiting surface 82b of the lens 82. On the other hand, it is preferable that the lens 82 is thin from the viewpoint of miniaturizing the light source device.

As described above, the prisms 82p arranged on the light-exiting surface 82b of the lens 82 each have a function of changing the direction of the light propagated in the lens 82 and oriented in some directions to a direction normal to the light-exiting surface 82b (Y direction in the example shown in FIGS. 7 and 8). Thus, as in the case of the lens 83 described with reference to FIG. 9, some of the light that has reached the vicinity of the prisms 82p has the direction of light changed to the Y direction by optical functions of the prisms 82p and is irradiated toward the light-entering surface 81a of the lens 81. In addition, the light in which the direction of light is not changed in the Y direction is irradiated toward the light-entering surface 81a of the lens 81 as diffused light.

The plurality of diffusing prisms 81dp of the lens 81 are arranged on the light-entering surface 81a, and have a function of diffusing light emitted from the lens 82 and introducing said light into the lens 81. In addition, light irradiated at the light-entering surface 81a is light that has been diffused in advance by the lens 82. Thus, light that has passed through the diffusing prisms 81dp is further diffused and travels in the lens 81 from the light-entering surface 81a toward the light-exiting surface 81b. Some of the light diffused at the light-entering surface 81a is reflected at the side surface of the lens 81 and travels toward the light-exiting surface 81b.

Thus, in the case of the present embodiment, the light is diffused in advance by the lens 82 before the light is introduced into the lens 81. In addition, when the light is introduced into the lens 81, it is further diffused by the diffusing prisms 81dp. Thus, when the light reaches the prisms 81p provided on the light-exiting surface 81b of the lens 81, the three colors of light is almost equally mixed in each region of the light-exiting surface 81b. Therefore, as shown in FIG. 8, the light emitted from the prisms 81p becomes the white light LW with little uneven luminance. It is needless to say that the light that reaches the prisms 81p includes diffused light that is not changed in the Y direction. However, in the case of the present embodiment, a ratio of the white light travelling in the Y direction and the diffused light travelling in the direction inclined with respect to the Y direction is approximately the same in each region of the light-exiting surface 81b, and thus, it is possible to obtain light with little uneven luminance for the entire light irradiated at the light guide plate 30.

In addition, in the case of the present embodiment, a separation distance 51P1 between the light-emitting diode element 51g and the light-emitting diode element 51b adjacent to each other is 30% or more with respect to a distance 51P2 between a center of the light-emitting diode element 51g and a center of the light-emitting diode element 51b. The light-emitting diode elements of the light-emitting element portion 50 are arranged at equal intervals, and thus, the above-described relationship for each of the plurality of light-emitting diode elements 51 is valid. Thus, utilization efficiency of the light-emitting diode elements 51 can be improved by increasing the separation distance 51P1. For example, a reduction in the number of light-emitting diode elements 51 leads to a reduction in power consumption or a reduction in the number of components.

Note that, in the case of the present embodiment, the method of irradiating the white light LW along the Y direction has been described, and this description relates to a direction of travel of the white light LW in the XY plane shown in FIG. 8. As shown in FIG. 7, in a YZ plane, it is preferable that the white light LW travels in the direction inclined with respect to the Y direction. This is because in the case of the transparent display device, the light is reflected at the front surface 30f of the light guide plate 30 (or the front surface 20f of the substrate 20) so that the light reaches the liquid crystal layer LQL, as described with reference to FIGS. 5 and 6.

Therefore, the plurality of prisms 81p shown in FIG. 8 are arranged on the light-exiting surface 81b along the X direction and extend along the Z direction. The plurality of prisms 82p are arranged on the light-exiting surface 82b along the X direction and extend along the Z direction. In addition, the plurality of diffusing prisms 81dp are arranged on the light-entering surface 81a along the X direction and extend along the Z direction. As a result, optical functions of each of the prisms 81p, the prisms 82p, and the diffusing prisms 81dp do not act with respect to the Z direction shown in FIG. 7. Thus, as shown in FIG. 7, the white light LW can be reflected at the front surface 30f of the light guide plate 30.

<Modification Example>

Figure 10:
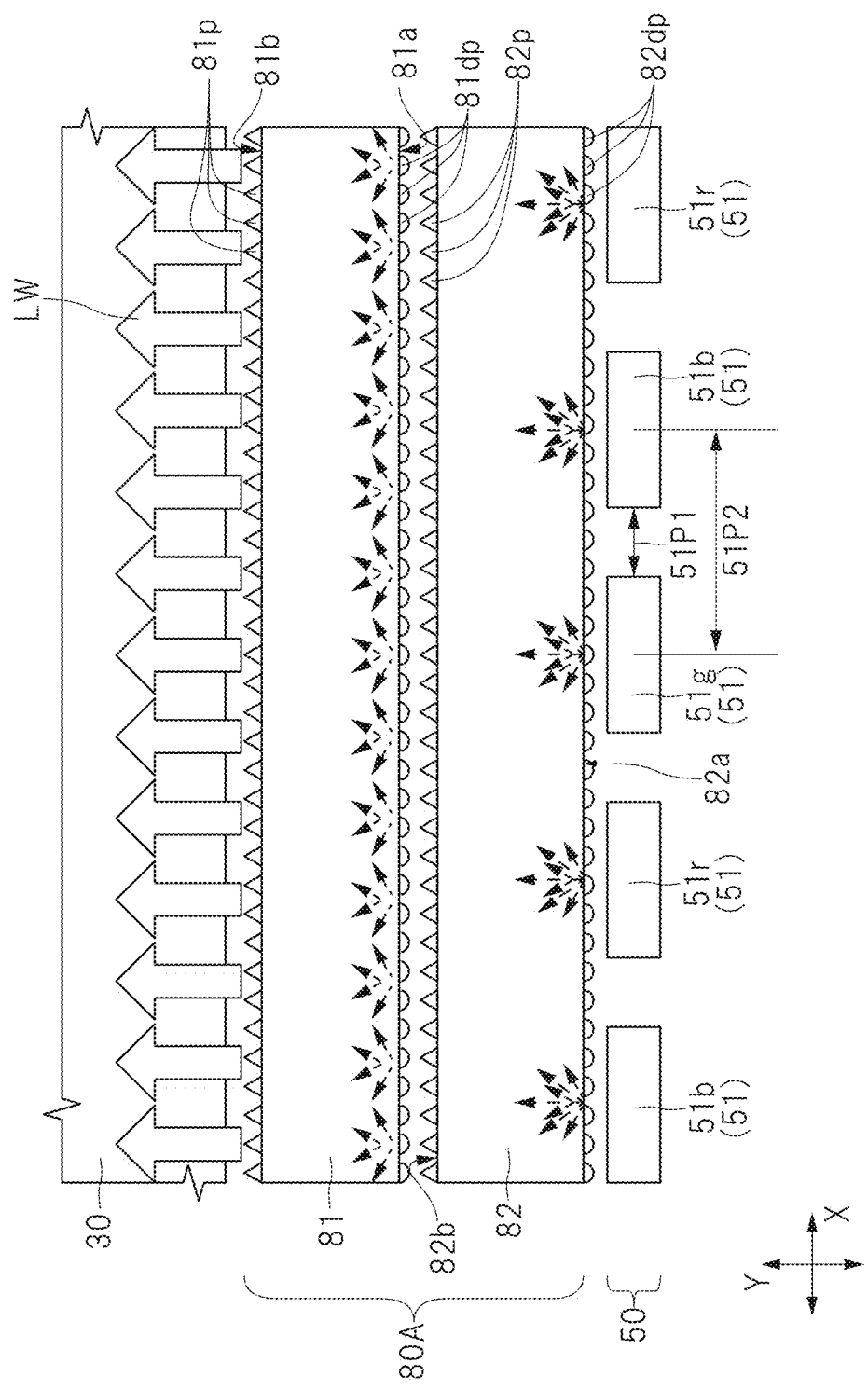
FIG. 10 is an enlarged cross-sectional view showing a modification example with respect to the lens portion shown in FIG. 8.

Next, a modification example with respect to the lens portion shown in FIGS. 7 and 8 will be described. FIG. 10 is an enlarged cross-sectional view showing the modification example with respect to the lens portion shown in FIG. 8. A lens portion 80A has the lens 82 that differs in structure from that of the lens portion 80 shown in FIG. 8.

In the example shown in FIG. 10, the lens 82 includes a plurality of diffusing prisms 82dp arranged on the light-entering surface 82a and capable of diffusing light emitted from any of the plurality of light-emitting diode elements 51 and introducing said light into the lens 82. Each of the diffusing prisms 82dp has the same structure as the diffusing prisms 81dp described with reference to FIG. 8. Light from the light-emitting diode elements 51 is irradiated at the light-entering surface 82a of the lens 82, and thus, in a case where the arrangement pitch of the light-emitting diode elements 51 is large, a degree of diffusion of the light caused by optical diffusion functions of the diffusing prisms 82dp is lower than a degree of diffusion obtained by diffusion functions of the diffusing prisms 81dp of the lens 81. However, the lens 82 is provided for pre-processing in which the light that is introduced into the lens 81 is diffused in advance. Providing the plurality of diffusing prisms 82dp on the light-entering surface 82a of the lens 82 allows the light irradiated on the light-entering surface 81a of the lens 81 to be in a more diffused state than in the example shown in FIG. 8. Therefore, the present modification example is preferable from the viewpoint of diffusing the light supplied to the lens 81. If it is possible to improve diffusion of the light from the light-emitting diode elements 51, the arrangement pitch of the plurality of light-emitting diode elements can be widened within the range of the required luminance level.

Figure 11:
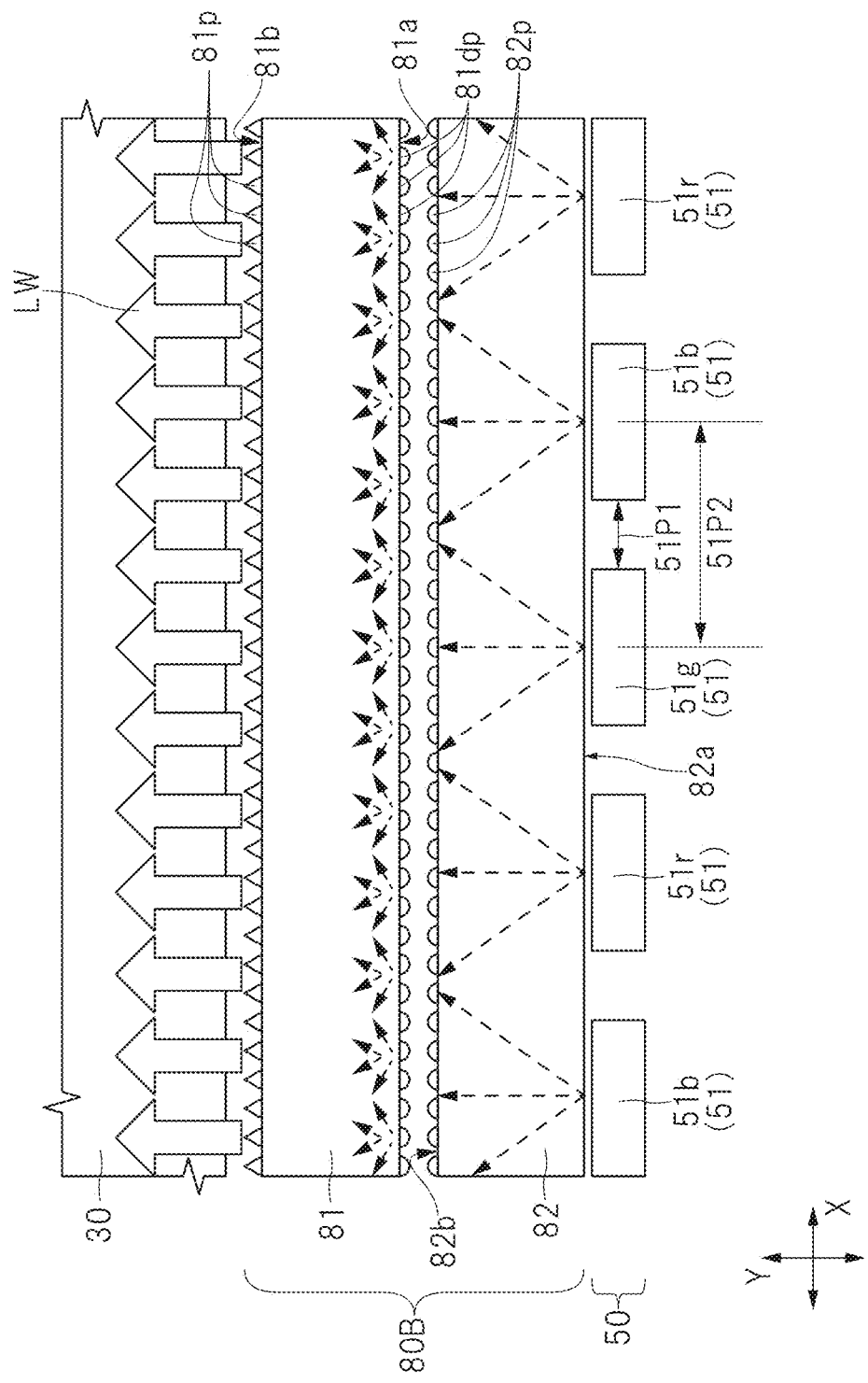
FIG. 11 is an enlarged cross-sectional view showing another modification example with respect to the lens portion shown in FIG. 8.

FIG. 11 is an enlarged cross-sectional view showing another modification example with respect to the lens portion shown in FIG. 8. A lens portion 80B shown in FIG. 11 has the prisms 82p of the lens 82 that differ in structure from those of the lens portion 80 shown in FIG. 8.

In the case of the lens portion 80B shown in FIG. 11, the plurality of prisms 81p of the lens 81 and the plurality of prisms 82p of the lens 82 differ in structure. In detail, as in the case of the lens portion 80 shown in FIG. 8, the plurality of prisms 81p each have a function of changing the direction of the light propagated in the lens 81 and oriented in some directions to a direction normal to the light-exiting surface 81b (Y direction in the example shown in FIGS. 7 and 8). On the other hand, the plurality of prisms 82p of the lens 82 of the lens portion 80B shown in FIG. 11 each have a function of diffusing the light emitted from the light-exiting surface 81b of the lens 82. In other words, the plurality of prisms 82p in the present modification example are diffusing prisms capable of diffusing the light emitted from the light-exiting surface 81b of the lens 82. In this manner, in the case of the present modification example, the prisms 81p and the prisms 82p differ in function, and thus, structures thereof differ in a corresponding manner. Providing the prisms 82p as the diffusing prisms as in the present modification example allows the light irradiated on the light-entering surface 81a of the lens 81 to be in a more diffused state than in the example shown in FIG. 8. Therefore, the present modification example is preferable from the viewpoint of diffusing the light supplied to the lens 81.

Note that, although not shown in the drawings, the present modification example and the modification example described with reference to FIG. 10 can be combined to further form the plurality of diffusing prisms 82dp shown in FIG. 10 on the light-entering surface 82a of the lens 82 shown in FIG. 11.

For FIGS. 8, 10, and 11, an example in which the lens 81 and the lens 82 are arranged between the light guide plate 30 and the light-emitting element portion 50 along the Y direction has been described. However, the number of lenses arranged between the light guide plate 30 and the light-emitting element portion 50 in the Y direction is not limited to two, and may be three or more. For example, another lens may be further arranged between FIGS. 8, 10, and 11 and the light-emitting element portion 50. In this manner, increasing the number of lenses arranged in the Y direction makes it possible to improve diffusion of the light from the light-emitting diode element 51, and thus, the arrangement pitch of the plurality of light-emitting diode elements can be widened within the range of the required luminance level. On the other hand, increasing the number of lenses leads to a more complicated manufacturing process. Therefore, it is preferable that the lens portion is constituted by the lens 81 and the lens 82 as shown in FIGS. 8, 10, and 11 from the viewpoint of reducing the number of components or improving manufacturing efficiency. In other words, it is preferable that no other lens is interposed between the lens 82 and the light-emitting element portion 50.

In the foregoing, embodiments and typical modification examples have been described. However, the above-described technique can be applied to various modification examples other than those described above. For example, the above-described modification examples may be combined with one another.

One skilled in the art can conceive various alterations and corrections within a range of the concept of the present invention, and it is understood that such alterations and corrections also fall within the scope of the present invention. For example, any addition or omission of processes, or any modification of conditions to the above-described embodiments by one skilled in the art also fall within the scope of the present invention as long as they include the gist of the present invention.

The present invention can be applied to display devices and electronic devices incorporating display devices.

What is claimed is:

1. A display device comprising:
a first substrate having a first front surface and a first back surface on a side opposite to the first front surface;

a liquid crystal layer arranged on the first front surface of the first substrate;

a light guide plate having a first surface facing the first front surface of the first substrate, a second surface on a side opposite to the first surface, and a first side surface intersecting the first surface and the second surface;

a light-emitting element portion having a plurality of light-emitting diode elements each arranged at a position facing the first side surface of the light guide plate and along a first direction; and a lens portion arranged between the light guide plate and the light-emitting element portion, wherein the light-emitting element portion, the lens portion, and the light guide plate are arranged along a second direction intersecting the first direction, wherein the lens portion includes:
- a first lens arranged between the light guide plate and the light-emitting element portion, and having a first light-entering surface, a first light-exiting surface on a side opposite to the first light-entering surface, and a plurality of first prisms arranged on the first light-exiting surface; and
- a second lens arranged between the first lens and the light-emitting element portion, and having a second light-exiting surface arranged at a position facing the first light-entering surface, a second light-entering surface on a side opposite to the second light-exiting surface, and a plurality of second prisms arranged on the second light-exiting surface, wherein the first lens includes a plurality of first diffusing prisms arranged on the first light-entering surface and capable of diffusing light emitted from the second lens and introducing said light into the first lens.

2. The display device according to claim 1, wherein the light-emitting element portion and the lens portion are arranged so as to face each other in the second direction intersecting the first direction, wherein a third direction is a direction normal to a first plane including the first direction and the second direction, wherein the plurality of first prisms are arranged on the first light-exiting surface along the first direction and extend along the third direction, wherein the plurality of second prisms are arranged on the second light-exiting surface along the first direction and extend along the third direction, and wherein the plurality of first diffusing prisms are arranged on the first light-entering surface along the first direction and extend along the third direction.

3. The display device according to claim 1, wherein the second lens includes a plurality of second diffusing prisms arranged on the second light-entering surface and capable of diffusing light emitted from any of the plurality of light-emitting diode elements and introducing said light into the second lens.

4. The display device according to claim 1, wherein the plurality of first prisms and the plurality of second prisms differ in structure.

\* \* \* \* \*